United States Patent
Chapeau

(10) Patent No.: US 12,546,520 B2
(45) Date of Patent: Feb. 10, 2026

(54) METHOD OF EVALUATING REFRIGERANT CHARGE WITHIN A REFRIGERATION CIRCUIT

(71) Applicant: Carrier Corporation, Palm Beach Gardens, FL (US)

(72) Inventor: Lucas Chapeau, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 32 days.

(21) Appl. No.: 18/460,746

(22) Filed: Sep. 5, 2023

(65) Prior Publication Data
US 2024/0077237 A1 Mar. 7, 2024

(30) Foreign Application Priority Data
Sep. 5, 2022 (EP) ..................................... 22193920

(51) Int. Cl.
F25B 49/02 (2006.01)
F25B 49/00 (2006.01)

(52) U.S. Cl.
CPC ...... *F25B 49/005* (2013.01); *F25B 2500/222* (2013.01); *F25B 2700/04* (2013.01)

(58) Field of Classification Search
CPC .. F25B 49/005; F25B 49/02; F25B 2500/222; F25B 2600/05; F25B 2700/04
See application file for complete search history.

(56) References Cited

U.S. PATENT DOCUMENTS

| 4,577,469 A | * | 3/1986 | Okura | B60H 1/3225 62/133 |
| 7,891,201 B1 | * | 2/2011 | Bush | F25B 9/008 62/115 |
| 2011/0138825 A1 | * | 6/2011 | Chen | F25B 49/02 62/115 |

FOREIGN PATENT DOCUMENTS

| EP | 1876403 A1 | 1/2008 |
| EP | 2821731 A1 | 1/2015 |
| JP | H10281599 A | 10/1998 |

OTHER PUBLICATIONS

WO 2015/198489 (English Translation) (Year: 2015).*
Extended European Search Report received for EP Application No. 22193920.0, mailed on Feb. 13, 2023, 6 Pages.

* cited by examiner

*Primary Examiner* — Jonathan Bradford
(74) *Attorney, Agent, or Firm* — Drew Folgmann

(57) ABSTRACT

A method of evaluating refrigerant charge within a refrigeration circuit. The method includes measuring a quantity of liquid refrigerant within a flash tank of the refrigeration circuit; determining an expected quantity of liquid refrigerant within the flash tank; comparing the expected quantity with the measured quantity of liquid refrigerant within the flash tank; and evaluating the refrigerant charge within the refrigeration circuit based on the comparison.

20 Claims, 4 Drawing Sheets

METHOD OF EVALUATING REFRIGERANT CHARGE WITHIN A REFRIGERATION CIRCUIT

CROSS REFERENCE TO RELATED APPLICATIONS

This application claims priority to EP Patent Application No. 22193920.0 filed on Sep. 5, 2022, which is incorporated by reference herein in its entirety.

BACKGROUND

The present invention relates to a method of evaluating refrigerant charge (quantity) within a refrigeration circuit. The invention also extends to a method of determining a leak from a refrigeration circuit. A computer programme product for execution of these methods are also provided by the invention. The invention further extends to apparatus for evaluating refrigerant charge and determining a leak from a refrigeration circuit.

It is advantageous to know the quantity of refrigerant (also termed 'refrigerant charge') within a refrigeration circuit. Not only is the amount of refrigerant in the refrigeration circuit tied closely to the performance of the refrigeration circuit, with too much or (more commonly) too little refrigerant resulting in sub-optimal performance of the refrigeration circuit, but it can be important to identify any refrigerant leaks from the refrigerant circuit since such leaks may pose a safety risk to personnel and/or may result in damage to the refrigeration circuit or other associated equipment.

Known methods for determining the refrigerant charge within a refrigeration circuit comprise draining (i.e. removing) all of the refrigerant from the refrigeration circuit and measuring its total quantity once drained. The refrigerant circuit is then recharged with refrigerant, and is optionally topped up (depending on whether the measured refrigerant quantity was sufficient or whether there was an 'undercharge'—i.e. insufficient refrigerant) with additional refrigerant to ensure an optimal level of refrigerant is contained therein. Refrigerant may also be removed in the event that there is an 'overcharge' (i.e. too much refrigerant in the circuit).

Other known methods for charge determination involve the use of a sight glass provided at, e.g., a flash tank of the refrigeration circuit. The level of the refrigerant in the flash tank can be viewed via the sight glass, and a guess or estimate can be made by an operative if there is an undercharge of refrigerant or not. No estimate of overcharge using a sight glass as in the prior art is possible however.

An improved method for evaluating the quantity of refrigerant (i.e. refrigerant charge) within a refrigeration circuit is desired.

BRIEF SUMMARY

In accordance with a first aspect of the invention, there is provided a method of evaluating refrigerant charge within a refrigeration circuit, the method comprising: measuring a quantity of liquid refrigerant within a flash tank of the refrigeration circuit; determining an expected quantity of liquid refrigerant within the flash tank; comparing the expected quantity with the measured quantity of liquid refrigerant within the flash tank; and evaluating the refrigerant charge within the refrigeration circuit based on the comparison.

BRIEF DESCRIPTION OF THE DRAWINGS

Certain embodiments of the invention will now be described, by way of example only, and with reference to the accompanying drawings, in which.

DETAILED DESCRIPTION

Figure 1:
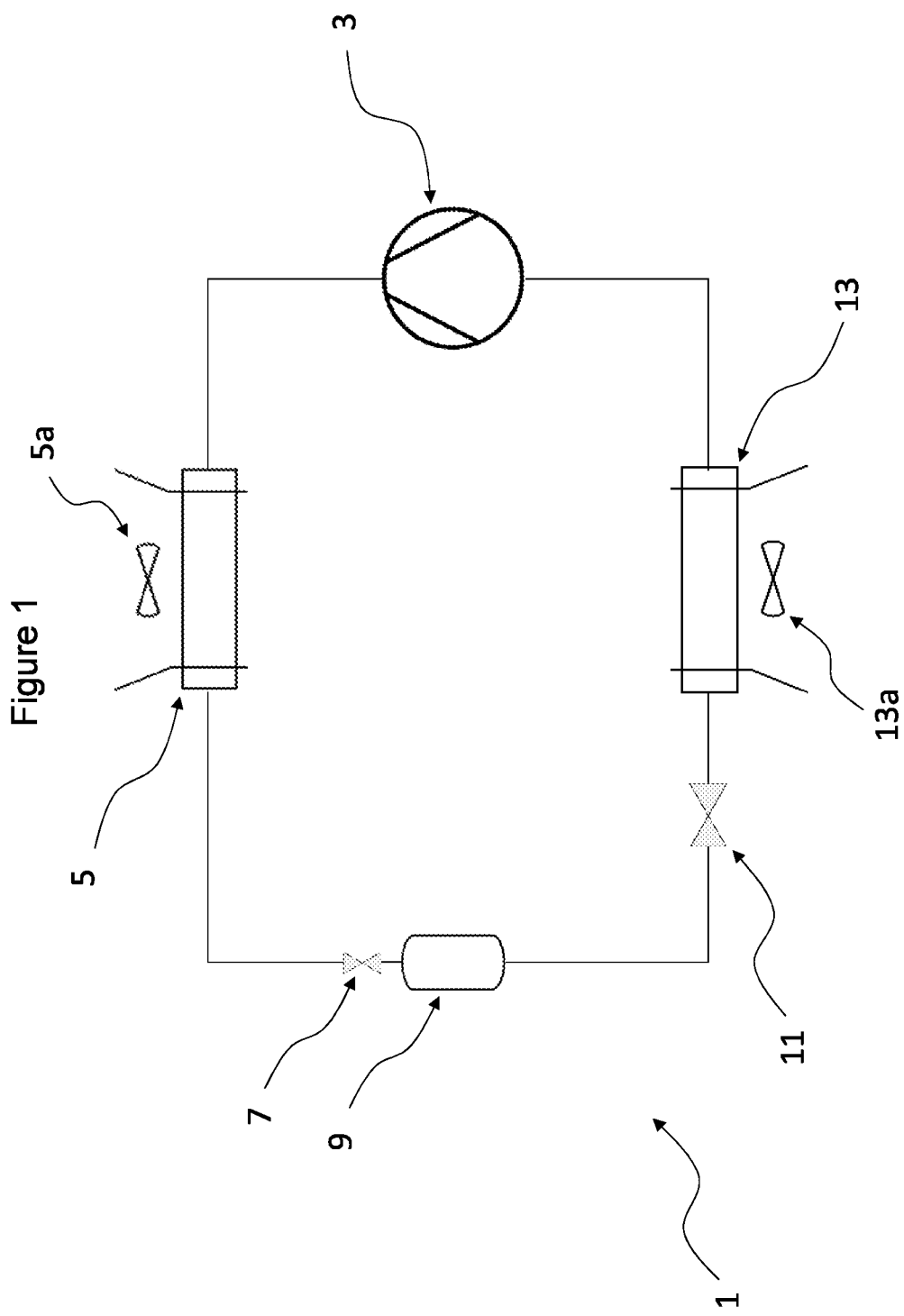
FIG. 1 is a schematic illustration of a refrigeration circuit.

In accordance with a first aspect of the invention, there is provided a method of evaluating refrigerant charge within a refrigeration circuit, the method comprising: measuring a quantity of liquid refrigerant within a flash tank of the refrigeration circuit; determining an expected quantity of liquid refrigerant within the flash tank; comparing the expected quantity with the measured quantity of liquid refrigerant within the flash tank; and evaluating the refrigerant charge within the refrigeration circuit based on the comparison.

The method of the first aspect is based on the realisation that the total quantity of refrigerant in the refrigeration circuit (i.e. refrigerant charge) is proportional to the quantity of liquid refrigerant in the flash tank. The method of the first aspect if also based on the realisation that the quantity of liquid refrigerant in the flash tank is, assuming all other factors remain constant, directly proportional to ambient temperature surrounding the refrigeration circuit, which can also be considered as the outside air temperature (i.e. the temperature of the air used to cool heated refrigerant at the condenser). Therefore, for a given ambient temperature an expected liquid quantity within the flash tank can be determined (either by calculation that has, optionally, been calibrated with experimental testing and/or based on predetermined knowledge of the system (e.g. from a look-up table)) and this determined liquid quantity is proportional to the expected total quantity (i.e. charge) of refrigerant in the refrigeration circuit. By measuring the actual quantity of liquid refrigerant within the flash tank, and by comparing that to the expected quantity of liquid refrigerant within the flash tank, an evaluation can therefore be made with regards to the total refrigerant charge in the refrigeration circuit relative to the expected refrigerant charge in the refrigeration circuit.

The invention of the first aspect is advantageous since it permits the evaluation of refrigerant charge without significant operative intervention as in the prior art methods. There is no need to drain the entire refrigeration circuit, which is laborious and time consuming, to determine refrigerant charge using the method of the first aspect. Additionally, there is no requirement for a sight glass at the flash tank for an operative to make a potentially inaccurate estimation of the refrigerant charge level based on a visual inspection (which can be difficult in any event given the poor accessibility often associated with the placement of flash tanks, particularly in the content of refrigeration circuits used for transport refrigeration units—more on this optional feature below). Moreover, the method of the first aspect can provide an effectively instantaneous evaluation of refrigerant charge level, as desired, which the prior art methods are not similarly capable of. All that is required for an evaluation of refrigerant charge level using the method of the first aspect is for a determination (e.g. a calculation) of expected refrigerant charge in the flash tank and a measurement of the actual refrigerant charge in the flash tank, which can be done quickly (effectively instantaneously) and on-demand.

As is known to the skilled person, a refrigeration circuit has a quantity of refrigerant provided therein and this is termed a 'refrigerant charge'. The refrigerant acts as a working fluid to enable the functioning and operation of the refrigeration circuit.

The expected quantity of liquid refrigerant in the flash tank may be the quantity of liquid refrigerant expected within the flash tank when the refrigerant circuit has an optimal (i.e. an ideal amount with respect to the performance of the refrigeration circuit) amount of refrigerant charge. The optimal charge may be a quantity that is predetermined and/or known based on the componentry of the refrigeration circuit and/or its desired/expected operating performance.

Alternatively, the expected quantity of liquid refrigerant in the flash tank may be a quantity expected in the flash tank when there is an overcharge and/or an undercharge, optionally an undercharge and/or an overcharge in the refrigeration circuit that is detrimental to performance and/or may cause damage to the refrigeration circuit.

An undercharge may be a refrigerant charge that is 5%, 10%, 15%, 20%, 25%, 30% lower than the optimal refrigerant charge of the refrigeration circuit. Optionally, 15% or 30% lower than the optimal refrigerant charge. This is because for a refrigeration circuit there is typically no notable performance degradation until an undercharge of 15% or more exists, and there typically no notable risk of refrigeration circuit damage until an undercharge of 30% or more exists. The undercharge may be a refrigerant charge that is more than 30% lower than the optimal refrigerant charge.

An overcharge may be a refrigerant charge that is 5%, 10%, 15%, 20%, 25%, 30% higher than the optimal refrigerant charge of the refrigeration circuit. Optionally, 5% or 20% more than the optimal refrigerant charge. This is because for a refrigeration circuit there is typically no notable performance degradation until an overcharge of 5% or more exists, and there typically no notable risk of refrigeration circuit damage until an overcharge of 20% or more exists. The overcharge may be a refrigerant charge that is more than 30% higher than the optimal refrigerant charge.

The flash tank, which may also be termed a receiver and/or a vapor-liquid separator, is a device used to separate/settle out liquid phase refrigerant from gas phase refrigerant and to ensure only (or substantially only) liquid phase refrigerant is supplied to downstream in the refrigeration circuit. Given the function of the flash tank, it can be advantageously leveraged in the method of the first aspect given liquid refrigerant should always be present therein during operation of the refrigeration circuit.

The expected quantity of liquid refrigerant in the flash tank and the measured quantity of liquid refrigerant may be a volume and/or a mass of refrigerant. The refrigerant charge may similarly be a volume and/or mass.

The expected quantity of liquid refrigerant in the flash tank may be the expected quantity of liquid refrigerant in the flash tank when the refrigeration circuit has an optimal charge/quantity of refrigerant therein, as discussed above.

The refrigeration circuit may comprise a compressor, a condenser, an expansion valve and an evaporator sequentially fluidly connected in a circuit. As will be readily apparent to the skilled person, the components of the refrigeration circuit (i.e. the condenser, the expansion valve and the evaporator) will be connected in a closed refrigerant circuit via appropriate refrigerant lines/conduits.

By sequentially fluidly connected, it is meant that the compressor, condenser, expansion valve and evaporator are connected in that order within the circuit with respect to the direction of flow of refrigerant in a cooling mode of operation of the refrigeration circuit. As such, in the cooling mode of operation, refrigerant in the circuit flows from the compressor to the condenser, from the condenser to the expansion valve, from the expansion valve to the evaporator, and from the evaporator back to the condenser. It should be noted that the sequential order of these components does not preclude the introduction of additional, optional components (e.g. pre-expansion valve—more on this below) at intervening positions within the circuit.

The flash tank may be situated downstream of the condenser, optionally directly downstream of the condenser. The flash tank may be upstream of the expansion valve, optionally directly upstream of the expansion valve.

The refrigeration circuit may comprise one or more condenser fans associated with the condenser and configured to draw air over the condenser and/or one or more evaporator fans associated with the evaporator and configured to draw air over the evaporator.

The method may comprise cooling and/or refrigerating a refrigerated volume using the refrigeration circuit.

The cooling and/or refrigerating may occur simultaneously (i.e. at the same time) as one, more or all of the other steps of the method of the first aspect (e.g. the steps of measuring, determining, comparing and/or evaluating). The method thus allows normal operation of the refrigeration circuit whilst also allowing refrigerant charge to be evaluated.

The step(s) of cooling and/or refrigerating may comprise: drawing air or an air gas mixture from the interior of the refrigerated volume, optionally by means of the evaporator fan(s) associated with the evaporator, passing the air or the air gas mixture through an airside of the evaporator in heat exchange relationship with refrigerant whereby the refrigerant absorbs heat from the air or the air gas mixture to thereby cool the air or the air gas mixture; and supplying the cooled air or air gas mixture back to the refrigerated volume. The heated refrigerant may then be supplied from the evaporator to the compressor where it is compressed before being sent to the condenser where it is cooled and substantially condensed into a liquid. The cooled and (primarily/substantially) liquid refrigerant may then be supplied to the flash tank for interim storage before being supplied to the expansion valve, which depressurises the refrigerant, to the evaporator to be used for cooling and/or refrigerating the air in the refrigerated volume again.

The refrigeration circuit may be a refrigeration circuit of a transportation refrigeration unit (TRU). That is to say, the refrigeration circuit may be comprised as part of the transport refrigeration unit (TRU). The transportation refrigeration unit may be arranged to cool and/or refrigerate a cargo space of a transportation refrigeration system with the refrigeration circuit. The method of the first aspect may comprise cooling and/or refrigerating a cargo space of a transportation refrigeration system (e.g. in line with the cooling and/or refrigerating operation described above). The method of the first aspect is particularly advantageous in the context of the transport refrigeration unit since, conventionally, it is difficult to evaluate refrigerant levels of refrigeration circuits comprised as part of a TRU without significant downtime in operation of the TRU (which is undesirable) and/or because TRUs are typically difficult to access for, e.g., a visual assessment of the level of refrigerant charge in the refrigeration circuit via the use of a sight glass as known from the prior art.

The transportation refrigeration unit may be mounted/attached to a transportation refrigeration system (e.g. a vehicle or a refrigerated trailer) and may be in operative association with a cargo space defined within the transportation refrigeration system. The transportation refrigeration unit may be configured to cool/refrigerate and/or maintain a controlled temperature environment within the cargo space. This may be in accordance with the cooling and/or refrigerating operation as discussed above. Specifically, the refrigerant circuit may be configured to refrigerate a cargo space/refrigerated volume of a transportation refrigeration system. The cargo space may be a temperature-controlled volume for storage and transport of perishable goods.

The method may comprise using and/or providing a transportation refrigeration unit as described herein.

The method may comprise providing a transportation refrigeration system, and attaching/mounting the transportation refrigeration unit to the transportation refrigeration system. The transportation refrigeration unit may be attached/mounted to the transportation refrigeration system such that it is in operative association with a cargo space therein and such that it is configured to refrigerate/cool the cargo space.

The transportation refrigeration system may be a refrigerated vehicle, e.g. a refrigerated light goods vehicle or heavy goods vehicle. The transportation refrigeration system may be a refrigerated trailer, e.g. a refrigerated trailer of a heavy goods vehicle.

The refrigerant may be a Class A or Class B refrigerant in accordance with the ASHRAE Standard 34, 2019. The refrigerant may be a Class 1, 2L, 2 or 3 refrigerant in accordance with the ASHRAE Standard 34, 2019.

More specifically, the refrigerant may be a Class A2L, A2, A3, B2L, B2 or B3 refrigerant in accordance with the ASHRAE Standard 34, 2019.

The refrigerant may be R134a refrigerant.

The method of the first aspect may comprise expanding the refrigerant prior to introducing the refrigerant into the flash tank to ensure that the flash tank comprises a mixture of refrigerant in the liquid and gaseous phases. Optionally, expanding the refrigerant prior to introducing the refrigerant into the flash tank comprises using a pre-expansion valve situated upstream of an inlet of the flash tank and downstream of an outlet of the condenser. The step of expanding the refrigerant prior to introducing the refrigerant into the flash tank may only occur shortly before and/or whilst the step of measuring a quantity of liquid refrigerant within a flash tank of the refrigeration occurs. Otherwise, the step of expanding the refrigerant prior to introducing the refrigerant into the flash tank may not occur. Alternatively, the step of expanding the refrigerant prior to introducing the refrigerant into the flash tank may occur continuously and throughout operation of the refrigeration circuit.

The magnitude of the expansion of the refrigerant prior to introducing the refrigerant into the flash tank may be, in the context of typical operating conditions and pressures of refrigeration circuits, small. For example, with reference to the expansion that takes place across the expansion valve of the refrigeration circuit, the expansion of the refrigerant prior to the introduction of the refrigerant into the flash tank may be small, very small or even negligible. The expansion of the refrigerant (e.g. the magnitude of the pressure drop) prior to the introduction of the refrigerant into the flash tank may be between 0.1% to 40% the size of the expansion (e.g. the magnitude of the pressure drop) that occurs across the expansion valve, for example 0.1%, 0.5%, 1%, 2%, 2.5%, 5%, 7.5%, 10%, 15%, 20%, 25%, 30%, 35% or 40%. The expansion of the refrigerant prior to the introduction of the refrigerant into the flash tank may comprise a pressure drop of the refrigerant, which may be between 1 to 3 bar (100,000 Pa to 300,000 Pa)

The step of expanding the refrigerant prior to its introduction into the flash tank can be particularly advantageous in scenarios where the flash tank is sized/configured such that in a cooling mode of operation of the refrigeration circuit, and in absence of the step of expanding the refrigerant prior to its introduction into the flash tank, the flash tank is 100% full of liquid refrigerant, or is close to 100% full of liquid refrigerant (e.g. greater than 90%, 95% or 99% full). A flash tank sized/configured as such can be advantageous where space for the refrigeration circuit is limited (e.g. in the context of a transport refrigeration unit). However, with the flash tank being sized as such, and in absence of the step of expanding the refrigerant prior to its introduction into the flash tank, it can be difficult to accurately evaluate a refrigerant charge using the method of the first aspect given, implicitly, the method of the first aspect relies on the quantity of liquid refrigerant in the flash tank varying with, optionally, a change in ambient temperature surrounding the refrigeration circuit (which would not readily occur if the flash tank is sized such that is at or close to 100% full of liquid refrigerant). By introducing the step of expanding the refrigerant prior to its introduction into the flash tank, the quantity of liquid refrigerant in the flash tank can be reduced, with some of the refrigerant in the flash tank being in the gas phase. Thus, the method of the first aspect can be carried out with greater accuracy/precision.

The step of expanding the refrigerant prior to its introduction into the flash tank is not essential however. For example, the flash tank may be sufficiently large/have a sufficient volume such that in a cooling mode of operation of the refrigeration circuit, and in absence of the step of expanding the refrigerant prior to its introduction into the flash tank, the flash tank is not at or close to 100% full of liquid refrigerant (e.g. may be 90%, 80%, 70%, 60%, 50% full of liquid refrigerant or less).

The method may comprise repeatedly and/or continually evaluating refrigerant charge within the refrigeration circuit by repeating the steps of: measuring a quantity of liquid refrigerant within a flash tank of the refrigeration circuit; determining an expected quantity of liquid refrigerant within the flash tank; comparing the expected quantity with the measured quantity of liquid refrigerant within the flash tank; and evaluating the refrigerant charge within the refrigeration circuit based on the comparison.

The method may comprise providing a real-time evaluation of refrigerant charge within the refrigeration circuit by carrying out the steps of the method of the first aspect in real-time (i.e. live/ in the present time).

As noted above, the method may comprise determining the expected quantity of liquid refrigerant within the flash tank based on ambient temperature surrounding the refrigeration circuit. This may be the ambient temperature surrounding the refrigeration circuit at the time the expected quantity of liquid refrigerant is determined. The method may comprise measuring the ambient temperature prior to, shortly after, or at the same time as, the step of determining the expected quantity of liquid refrigerant within the flash tank. Alternatively, and/or additionally, the method may comprise receiving data indicative of the ambient temperature prior to the step of determining the expected quantity of liquid refrigerant within the flash tank.

The step of determining the expected quantity of liquid refrigerant within the flash tank may comprise calculating the expected quantity of liquid refrigerant within the flash tank, optionally based on the ambient temperature surrounding the refrigeration circuit. The skilled person would know, for a given refrigeration circuit, how to calculate an expected volume of liquid refrigerant in a flash tank of that refrigeration circuit.

The step of calculating the expected quantity of liquid refrigerant within the flash tank may be based, in addition to optionally being based on the ambient temperature, on knowledge of variables, parameters and/or factors that impact the volume of liquid refrigerant within the flash tank. Each of these variables, parameters and/or factors may be assumed to be constant for the purposes of the calculation. The skilled person would know what variables, parameters and/or factors impact the quantity of liquid refrigerant within the flash tank for a given refrigeration circuit and thus what variables, parameters and/or factors may be accounted for when calculating the expected quantity of liquid refrigerant within the flash tank. These variables, parameters and/or factors may be those that knowledge of which allows for all points on a pressure-enthalpy diagram for the refrigeration circuit to be deduced, and hence the volumes occupied by each component of the refrigeration circuit, including the flash tank, can be calculated since they are proportional to the respective enthalpy differences For example, these variables, parameters and/or factors may, in addition to ambient temperature, include: the type of refrigerant, the operating mode of the refrigeration circuit, the componentry of the refrigerant circuit and associated dimensions, the assumed total quantity of refrigerant at a given level of (e.g. optimal) charge, the rate of air flow over the condenser and/or the evaporator, the operating parameters of the compressor, the condenser, the expansion valve, the magnitude of expansion at the expansion valve, the refrigeration circuit set point, the magnitude of the optional expansion prior to introduction the refrigerant into the flash tank, the void ratio for the condensation zone, the void ratio for the subcooling zone, the void ratio for the de-superheating zone associated with the condenser, and/or the void fraction of the evaporation zone and the vacuum rate of the overhearing zone associated with the evaporator.

The step of determining the expected quantity of liquid refrigerant within the flash tank may comprise, in addition to calculating the expected quantity of liquid refrigerant within the flash tank, calibrating the calculated expected quantity of liquid refrigerant within the flash tank based on results of experimental testing. The experimental testing may comprise measuring the quantity of liquid refrigerant within the flash tank of the refrigeration circuit at a known level of refrigerant charge within the refrigeration circuit (for example, at an optimal charge or at a fixed undercharge or overcharge). The experimental testing may comprise measuring the quantity of liquid refrigerant within the flash tank of the refrigeration circuit at a range of refrigerant charge levels within the refrigeration circuit and across a range of different ambient temperatures, optionally across a range of all possible/reasonable/expected ambient temperatures during normal use of the refrigeration circuit.

The step of determining the expected quantity of liquid refrigerant within the flash tank may comprise determining based on pre-determined knowledge of the flash tank and/or refrigeration circuit. This pre-determined knowledge may be supplied by, for example, the manufacturer of the refrigeration circuit/flash tank and/or may be based on experimental testing carried out to determine the quantity of liquid refrigerant in the flash tank at a given charge level of the refrigeration circuit and, optionally, at a range of different ambient temperatures.

The pre-determined knowledge may comprise the expected liquid refrigerant quantity in the flash tank for a given refrigerant charge level of the refrigeration circuit and for a range of different ambient temperatures. As such, the predetermined knowledge may permit an expected quantity of liquid refrigerant within the flash tank to be determined based on the ambient temperature and knowledge (or an assumption) of the charge of the refrigeration circuit.

The predetermined knowledge may be in the form of a reference or look-up table. Evaluating the refrigerant charge may comprise determining an undercharge in the refrigeration circuit of the expected quantity of liquid refrigerant exceeds (i.e. is greater than) the measured quantity of liquid refrigerant within the flash tank. That is to say, evaluating the refrigerant charge may comprise determining an undercharge in the refrigeration circuit if the measured quantity of liquid refrigerant within the flash tank is less than the expected quantity of liquid refrigerant within the flash tank Evaluating the refrigerant charge may comprise determining an undercharge in the refrigeration circuit if the measured quantity of liquid refrigerant within the flash tank is less than the expected quantity of liquid refrigerant within the flash tank by a threshold amount. For example, 5%, 10%, 15%, 20%, 25% or 30% less than the expected quantity. It is particularly advantageous, though optional, for the threshold amount to be 15% or 30%. This is because for a refrigeration circuit there is typically no notable performance degradation until an undercharge of 15% or more exists, and there typically no notable risk of refrigeration circuit damage until an undercharge of 30% or more exists. Consequently, it may be permissible to allow an undercharge of these magnitudes to occur within the refrigeration circuit before needing to take remedial action with respect to an undercharge (which may happen in response to the determination of an undercharge).

Evaluating the refrigerant charge may comprise determining an overcharge in the refrigeration circuit if the measured quantity of liquid refrigerant exceeds (i.e. is greater than) the expected quantity of liquid refrigerant within the flash tank. That is to say, evaluating the refrigerant charge may comprise determining an overcharge in the refrigeration circuit if expected quantity of liquid refrigerant within the flash tank is less than the measured quantity of liquid refrigerant within the flash tank.

Evaluating the refrigerant charge may comprise determining an overcharge in the refrigeration circuit if the measured quantity of liquid refrigerant within the flash tank exceeds (i.e. is greater) than the expected quantity of liquid refrigerant within the flash tank by a threshold amount. For example, 5%, 10%, 15%, 20%, 25% or 30% more than the expected quantity of liquid refrigerant within the flash tank. It is particularly advantageous, though optional, for the threshold amount to be 5% or 20%. This is because for a refrigeration circuit there is typically no notable performance degradation until an overcharge of 5% or more exists, and there is typically no notable risk of refrigeration circuit damage until an overcharge of 20% or more exists. Consequently, it may be permissible to allow an overcharge of these magnitudes to occur within the refrigeration circuit before needing to take remedial action with respect to an overcharge (which may happen in response to the determination of an overcharge).

The method may comprise providing an indication of the evaluated refrigerant charge. For example, the method may comprise providing an indication that an overcharge or undercharge has been determined. The indication may take the form of a sound (e.g. alarm signal), light (e.g. warning light) or written message.

The step of measuring the quantity of liquid refrigerant within the flash tank may comprise measuring the exact/precise/actual amount of refrigerant within the flash tank.

The step of measuring the quantity of liquid refrigerant within the flash tank may comprise determining that the quantity of refrigerant is greater or less than a first threshold and/or greater or less than a second threshold. This may occur without measuring the exact/precise/actual amount of refrigerant within the flash tank.

The first threshold may be indicative of an expected quantity of liquid refrigerant within the flash tank when there is an undercharge in the refrigeration circuit and/or an undercharge in the refrigeration circuit that is detrimental to performance and/or that may cause damage to the refrigeration circuit.

An undercharge may be a refrigerant charge of 5%, 10%, 15%, 20%, 25%, 30% or less refrigerant in the refrigeration circuit than the optimal charge of the refrigeration circuit. Optionally, 15% or 30% less. This is because for a refrigeration circuit there is typically no notable performance degradation until an undercharge of 15% or more exists, and there typically no notable risk of refrigeration circuit damage until an undercharge of 30% or more exists.

The second threshold may be indicative of an expected quantity of liquid refrigerant within the flash tank when there is an overcharge in the refrigeration circuit and/or an overcharge in the refrigeration circuit that is detrimental to performance and/or may cause damage to the refrigeration circuit.

An overcharge may be a refrigerant charge of 5%, 10%, 15%, 20%, 25%, 30% or more refrigerant in the refrigeration circuit than the optimal charge of the refrigeration circuit. Optionally, 5% or 20% more. This is because for a refrigeration circuit there is typically no notable performance degradation until an overcharge of 5% or more exists, and there typically no notable risk of refrigeration circuit damage until an overcharge of 20% or more exists.

The step of measuring the quantity of refrigerant within the flash tank may comprise measuring the quantity of refrigerant with a liquid level sensor disposed in operative association with the flash tank.

The liquid level sensor may be a float-type liquid level sensor, for example a horizontal float-type liquid level sensor comprising a float disposed on a pivotally supported arm. Alternatively, it may be a vertical float-type liquid level sensor comprising a float mounted on a vertical guide member. Float-type liquid level sensors are advantageously cheap.

The liquid level sensor may be a float-less type liquid level sensor. For example, the liquid level sensor may be a pressure transmitter liquid level sensor or an ultrasonic transmitter liquid level sensor.

The liquid level sensor may be continuous liquid level sensor. A continuous liquid level sensor is a sensor arranged to provide a measurement of the exact/precise/actual amount of liquid refrigerant within the flash tank.

The step of measuring the quantity of refrigerant within the flash tank may comprise measuring the quantity of refrigerant with two or more liquid level sensors that are each disposed in operative association with the flash tank. Each of the two or more (i.e. plurality) of liquid level sensors may be configured to measure whether the quantity of liquid refrigerant within the flash tank is greater than or less than a fixed/set quantity of liquid refrigerant (e.g. a quantity of liquid refrigerant indicative of an overcharge or an undercharge as discussed above). This may be achieved by fixing each of the plurality sensors at a fixed point along a height of the flash tank such that each sensor is indicative of a particular quantity of liquid refrigerant.

For example, a first sensor may be configured to measure whether the quantity of liquid within the flash tank is greater than or less than the first threshold as discussed above, and a second sensor may measure whether the quantity of liquid within the flash tank is greater than or less than the second threshold as discussed above.

The flash tank may comprise a movable desiccant. The desiccant may filter impurities from the refrigerant. This has the advantage that undesired chemical reactions which may lead to refrigerant degradation, can be avoided, and has the further advantage that the refrigerant is dehumidified. By placing the desiccant in the flash tank, it may be easily serviceable/ replaceable.

The flash tank may comprise a removeable cap that can be removed from the flash tank. This may permit access to the interior of the flash tank for an operative to perform servicing and/or maintenance operations (e.g. placing/replacing liquid level sensors and/or replacing the desiccant).

In a second aspect of the invention, there is provided a method determining a leak of refrigerant from a refrigeration circuit, the method comprising: evaluating a refrigerant charge within the refrigeration circuit in accordance with the first aspect of the invention at a first point in time: evaluating the refrigerant charge within the refrigeration circuit in accordance with the first aspect of the invention at a second, later point in time; and determining a leak of refrigerant from the refrigeration circuit based on determining that the refrigerant charge evaluated at the second point in time is less than the refrigerant charge evaluated at the first point in time.

The method of the second aspect is advantageous since it permits a leak to be determined, which is the main cause of failure of a refrigeration circuit, by evaluating the change in refrigerant charge over time. If it is determined that the refrigerant charge is decreasing over a period of time, for example beyond that which is expected over that period of time under normal operating conditions, then the presence of a leak can be determined. An operative can then remedy the leak in the refrigeration circuit before the refrigerant drops to a level that is low enough that might cause detriment to performance of the refrigeration circuit and/or damage to the components of the refrigeration circuit.

The method of the second aspect has further advantages in that it is unaffected by changing ambient temperature conditions when used to determine a leak. It is also advantages in that it may permit for leak detection before any degradation in performance of the refrigeration circuit that may otherwise be caused by virtue of the leak.

The step(s) of evaluating a refrigerant charge within the refrigeration circuit at a first point in time and/or at a second point in time in the method of the second aspect may be in accordance with any optional form of the method of the first aspect as described above.

Determining a leak from the refrigeration circuit in the method of the second aspect may be based solely on determining that the refrigerant charge evaluated at the second point in time is less than the refrigerant charge evaluated at the first point in time. Alternatively, the determination of a leak may be based on alternative and/or additional conditions/constraints.

For example, determining a leak from the refrigeration circuit in the method of the second aspect may be based on determining that the refrigerant charge evaluated at the second point in time is less than the refrigerant charge evaluated at the first point in time by a threshold amount. The threshold amount may be a fixed volume or mass of refrigerant, or it may be a threshold percentage of the refrigerant charge at the first point in time (e.g. 5%, 10%, 15%, 20%, 25%, 30%). The threshold amount may be equal to or greater than an amount of loss of refrigerant expected during normal operation of the refrigerant circuit. In that way, the method of second aspect avoids giving a false determination of a leak.

Determining a leak from the refrigeration circuit in the method of the second aspect may additionally and/or alternatively be based on the rate of change between the refrigerant charge evaluated at the second point in time and the refrigerant charge evaluated at the first point in time (e.g. the change in mass or volume of refrigerant charge per unit time). The method of the second aspect may only determine the presence of a leak when the rate of change between the refrigerant charge evaluated at the second point in time and the refrigerant charge evaluated at the first point in time is sufficiently high (i.e. above some threshold rate). The threshold rate may be a rate that is above the rate of expected losses of refrigerant that occur during normal operation of the refrigerant circuit. In that way, the method of second aspect avoids giving a false determination of a leak.

The method of the second aspect may comprise issuing an indication that a leak has been determined. The indication may take the form of a sound (e.g. alarm signal), light (e.g. warning light) or written message.

The method of the second aspect may comprise continually and/or repeatedly evaluating the refrigerant charge within the refrigeration circuit in accordance with the first aspect of the invention at additional different points in time. The method may consequently comprise continually and/or repeatedly determining a leak from the refrigeration circuit based on determining that the refrigerant charge evaluated at a given point in time is less than the refrigerant charge evaluated at an earlier point in time or is less than (optionally by a threshold amount) an average of the refrigerant charges evaluated at some or all earlier points in time.

The method of the first aspect and/or the second aspect may comprise the use of a controller comprising a processor. The controller/ processor may carry out and/or control the steps of: measuring a quantity of liquid refrigerant within a flash tank of the refrigeration circuit; determining (e.g. calculating) an expected quantity of liquid refrigerant within the flash tank; comparing the expected quantity with the measured quantity of liquid refrigerant within the flash tank; evaluating the refrigerant charge within the refrigeration circuit based on the comparison; and/or determining a leak from the refrigeration circuit based on determining that the refrigerant charge evaluated at the second point in time is less than the refrigerant charge evaluated at the first point in time.

In a third aspect of the invention there is provided an apparatus for evaluating refrigerant charge within a refrigeration circuit, the apparatus comprising:
a liquid level sensor disposed in operative association with a flash tank of a refrigeration circuit; and a processor in communication with the liquid level sensor, the processor being configured to: control the liquid level sensor to measure a quantity of refrigerant within the flash tank; determine an expected quantity of liquid refrigerant within the flash tank; compare the expected quantity of liquid refrigerant within the flash tank with the measured quantity of liquid refrigerant within the flash tank; and evaluate the refrigerant charge within the refrigeration circuit based on the comparison.

The processor of the third aspect of the invention may additionally be configured to: control the liquid level sensor to measure a quantity of refrigerant within a flash tank of the refrigeration circuit again, at a second point in time; determine an expected quantity of liquid refrigerant within the flash tank at the second point in time; to compare the expected quantity determined at the second point in time with the measured quantity of liquid refrigerant within the flash tank at the second point in time; evaluate the refrigerant charge within the refrigeration circuit based on the comparison at the second point in time; and determine a leak of refrigerant from the refrigeration circuit based on determining that the refrigerant charge evaluated at the second point in time is less than the refrigerant charge evaluated at the first point in time. As such, the apparatus of the third aspect may additionally be suitable for determining a leak of refrigerant from a refrigeration circuit.

It is implicit that the liquid level sensor is configured to communicate the measured quantity/quantities of liquid refrigerant within the flash tank to the processor.

The apparatus of the third aspect of the invention may be used to carry out the method of the first and/or second aspects of the invention, optionally in any optional form thereof. Accordingly, the apparatus of the third aspect of the invention may comprise or be in accordance with any compatible features discussed above in relation to the first and/or second aspects of invention.

In a fourth aspect of the invention, there is provided a computer programme product comprising instructions that, when executed on a processor that is in communication with a liquid level sensor that is in operative association with a flash tank of a refrigeration circuit, cause the processor to: control the liquid level sensor to measure a quantity of refrigerant within the flash tank of the refrigeration circuit; determine an expected quantity of liquid refrigerant within the flash tank; compare the expected quantity of liquid refrigerant with the measured quantity of liquid refrigerant within the flash tank; and evaluate the refrigerant charge within the refrigeration circuit based on the comparison.

The computer programme product of the fourth aspect may additionally comprise instructions that, when executed on the processor that is in communication with the liquid level sensor, cause the processor to: control the liquid level sensor to measure a quantity of refrigerant within a flash tank of the refrigeration circuit again, at a second point in time; determine an expected quantity of liquid refrigerant within the flash tank at the second point in time; compare the expected quantity determined at the second point in time with the measured quantity of liquid refrigerant within the flash tank at the second point in time; evaluate the refrigerant charge within the refrigeration circuit based on the comparison at the second point in time; and determine a leak from the refrigeration circuit based on determining that the refrigerant charge evaluated at the second point in time is less than the refrigerant charge evaluated at the first point in time.

The computer programme product of the fourth aspect may comprise instructions that, when executed on the processor that is in communication with the liquid level sensor, may cause the processor to carry out the method of the first and/or second aspects of the invention, optionally in any optional form thereof.

The computer programme product of the fourth aspect of the invention may be executed on the processor of the apparatus of the third aspect of the invention.

FIG. 1 shows a refrigerant circuit 1. The refrigerant circuit 1 comprises a compressor 3, a condenser 5, an expansion valve 11 and an evaporator 13 sequentially fluidly connected in a circuit by refrigerant lines. A quantity (charge) of R134a refrigerant is contained within the refrigeration circuit and, as is known, acts as a working fluid to provide cooling to a refrigerated volume as discussed further below.

The condenser 5 is associated with a condenser fan 5a configured to draw air over the condenser 5. The evaporator 13 is associated with an evaporator fan 13a that is configured to draw air over the evaporator.

The refrigeration circuit 1 additionally includes a flash tank 9 positioned upstream of the expansion valve 11, and a pre-expansion valve 7 positioned upstream of the flash tank 9 and downstream of an outlet of the condenser 5. The function of the pre-expansion valve 7 will be discussed below, with reference to FIG. 4.

Figure 4:
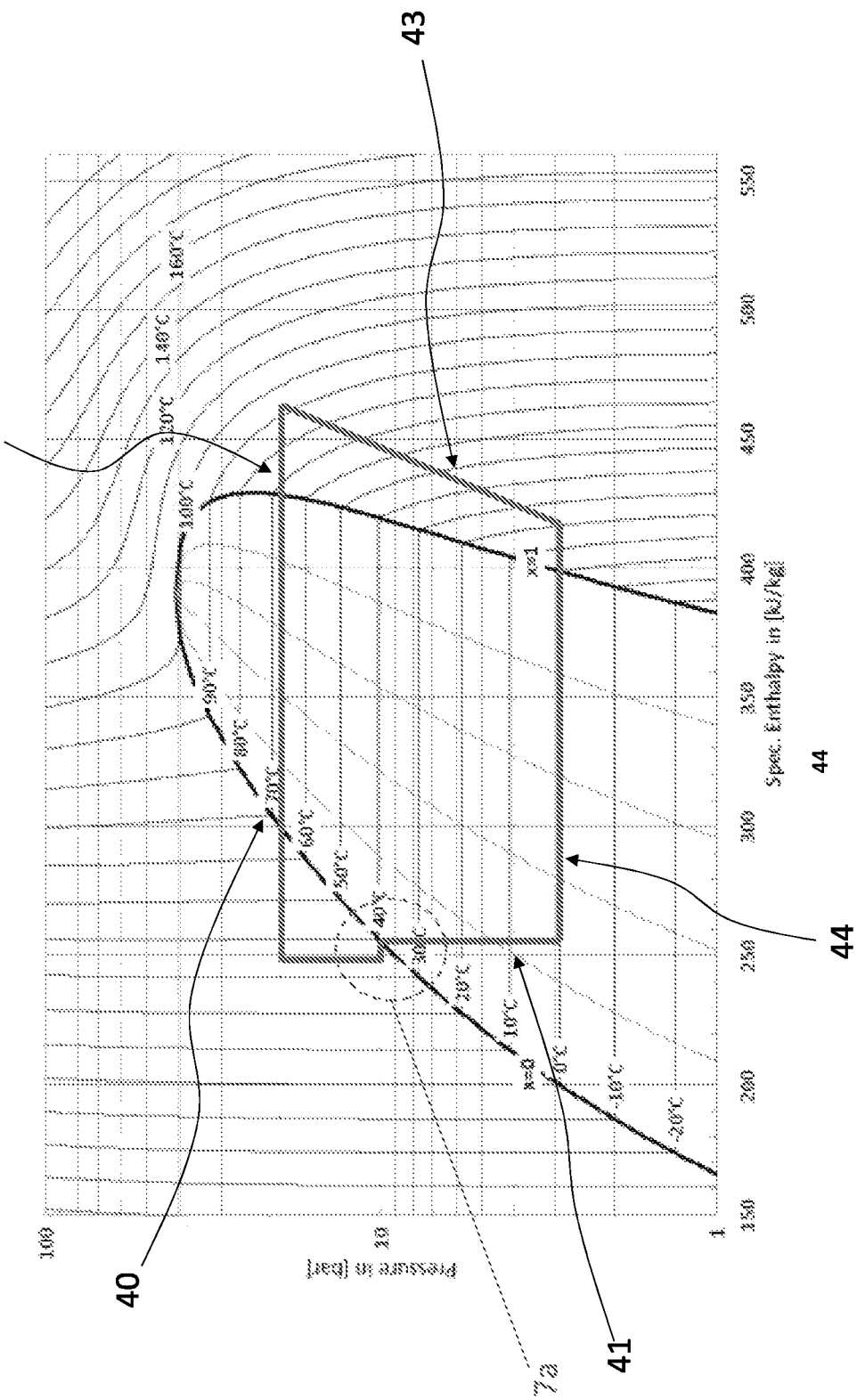
FIG. 4 shows a pressure-enthalpy chart for R134a refrigerant.

The refrigeration circuit 1 is arranged to cool a refrigerated volume in a broadly conventional manner as will be described below. The pressure, temperature and enthalpy changes that occur to the R134a refrigerant in the refrigeration circuit during the various stages of the refrigeration cycle are depicted in FIG. 4.

Cooling by the refrigeration circuit 1 comprises drawing air or an air gas mixture from the interior of the refrigerated volume by means of the evaporator fan 13a associated with the evaporator 13, passing the air or the air gas mixture through an airside of the evaporator 13 in heat exchange relationship with refrigerant, whereby the refrigerant absorbs heat (see FIG. 4, 44) from the air or the air gas mixture to thereby cool the air or the air gas mixture; and supplying the cooled air or air gas mixture back to the refrigerated volume. The heated refrigerant may then be supplied from the evaporator 13 to the compressor 3 where it is compressed (see FIG. 4, 43) before being sent to the condenser 5 where it is cooled and substantially condensed (see FIG. 4, 42) into a liquid through heat exchange with air drawn over the condenser 5 by the condenser fan 5a.

The cooled and (primarily) liquid refrigerant is then supplied to the pre-expansion valve 7. The pre-expansion valve 7 slightly expands the refrigerant by slightly depressurising it. The slight depressurisation that takes place at the pre-expansion valve is represented in region marked 7a in FIG. 4. Here it can be seen that the pre-expansion occurring at the pre-expansion valve 7 results in the refrigerant moving from above the saturated liquid line 40 to the saturated liquid line 40. In that way, the refrigerant that leaves the pre-expansion valve 7 comprises a mixture of refrigerant in the gaseous and liquid phases.

The refrigerant exiting the pre-expansion valve 7 is supplied to the flash tank 9 for interim storage. Given the refrigerant leaving the pre-expansion valve 7 is a mixture of refrigerant in the gaseous and liquid phases, the refrigerant within the flash tank 9 is equally a mixture of refrigerant in the gaseous and liquid phases and thus the flash tank 9 is not 100% full of liquid refrigerant. The flash tank 9 ensures that there is a buffer of liquid refrigerant to be supplied to the expansion valve 11 for cooling purposes.

From the flash tank 9, liquid refrigerant is supplied to expansion valve 11, which depressurises the refrigerant (see FIG. 4, 41). The refrigerant is then supplied back to the evaporator 13 to be used for cooling and/or refrigerating the air in the refrigerated volume again (see FIG. 4, 44) to restart the refrigeration cycle.

Figure 2:
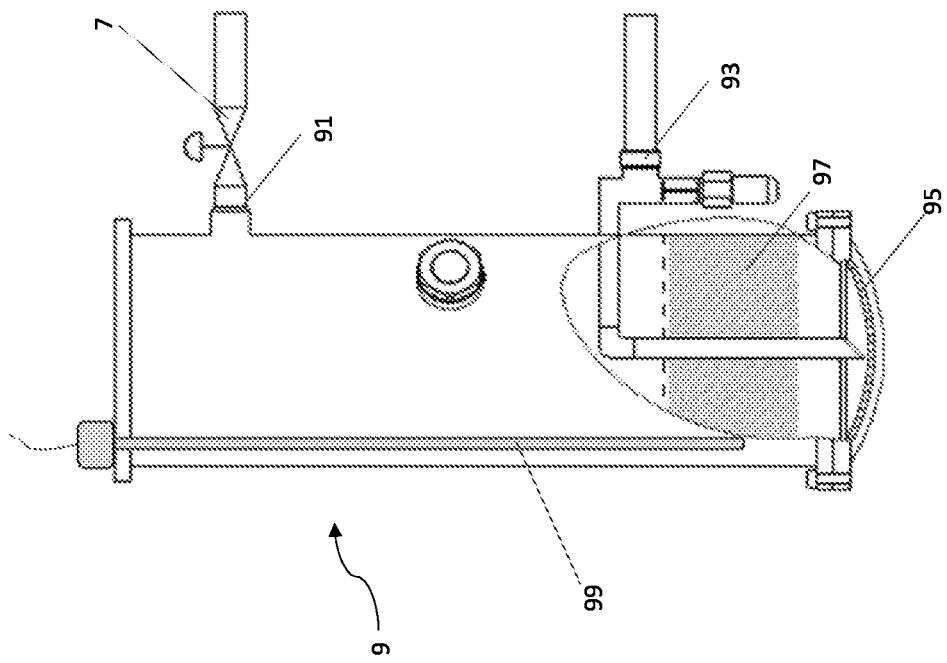
FIG. 2 depicts a flash tank of the refrigeration circuit of FIG. 1.

FIG. 2 shows further details of a flash tank 9 that can be incorporated into the refrigeration circuit 1 of FIG. 1. The flash tank 9 comprises an inlet 91 for refrigerant situated proximate the top of the flash tank 9, upstream of which the pre-expansion valve 7 is provided. The flash tank 9 further comprises an outlet 93 situated proximate a bottom of the flash tank 9. The outlet 93 provides an outlet for liquid refrigerant from the flash tank 9 to the expansion valve 11. The flash tank 9 additionally comprises a removable cap 95 and a moveable desiccant 97. The removable cap 95 provides access to the interior of the flash tank 9 for maintenance/servicing purposes, and can be used in conjunction with the moveable desiccant 97 such that can servicing can be achieved without the need to completely remove the flash tank 9 from the refrigeration circuit 1.

The flash tank 9 has a continuous liquid level sensor 99 situated therein, which is arranged to measure the precise amount of liquid refrigerant within the flash tank 9.

The measurements taken with the liquid level sensor 99 can be used to evaluate the refrigerant charge within the entire refrigeration circuit 1, which can thereby be used to determine a possible undercharge or overcharge of refrigerant in the refrigeration circuit 1. This is achieved by, in addition to measuring a quantity of liquid refrigerant within the flash tank 9 with the liquid level sensor 99, calculating an expected quantity of liquid refrigerant within the flash tank 9. The expected quantity of liquid refrigerant can be calculated under the assumption that the refrigeration circuit 1 is 'optimally' charged (i.e. has the optimal quantity of refrigerant therein) and based on the ambient temperature of the air surrounding the refrigeration circuit 1 at the time the quantity of refrigerant in the refrigeration circuit is measured. The skilled person would be aware how to calculate this expected quantity of liquid refrigerant in the flash tank 9 in this way.

Once the expected quantity and measured quantity of liquid refrigerant within the flash tank 9 have been obtained, these values can be compared and an evaluation of the charge level of the entire refrigeration circuit 1 can be made. This is because the quantity of liquid refrigerant within the flash tank 9 is directly proportional to the total refrigerant charge in the refrigeration circuit 1. Thus, by comparing the measured quantity of liquid in the flash tank 9 with the quantity of liquid expected if the flash tank 9 was optimally charged, it can be determined whether there is an overcharge of refrigerant in the refrigeration circuit 1 (i.e. where the measured quantity of liquid in the flash tank 9 is greater than the expected quantity), whether is an undercharge of refrigerant in the refrigeration circuit 1 (i.e. where the measured quantity of liquid in the flash tank 9 is less than the expected quantity), or whether the charge is optimal (i.e. where the measured quantity of liquid in the flash tank 9 is equal to the expected quantity).

Based on this evaluation, an indication can be provided to an operative regarding the charge and, if required, remedial action can be taken by the operative to remedy any overcharge or undercharge in the refrigeration circuit 1.

The measurements taken with the liquid level sensor 99 can also be used to determine the presence of a leak from the refrigeration circuit 1. The determination of a leak comprises evaluating the charge level of the refrigeration circuit 1 as described above at a first point in time, and evaluating the charge level of the refrigeration circuit 1 again at least a second point in time (and optionally several additional points in time). The presence of a leak from the refrigeration circuit 1 can then be determined based on determining that the refrigerant charge evaluated at the second point in time is less than the refrigerant charge evaluated at the first point in time (or based on determining that the refrigerant charge at a given point in time is less than an average of the refrigerant charges evaluated at some or all earlier points in time).

If a leak is determined, an indication can be provided to an operative regarding the presence of a leak, and remedial action can be taken by the operative to remedy the leak of refrigerant from the refrigeration circuit.

Figure 3:
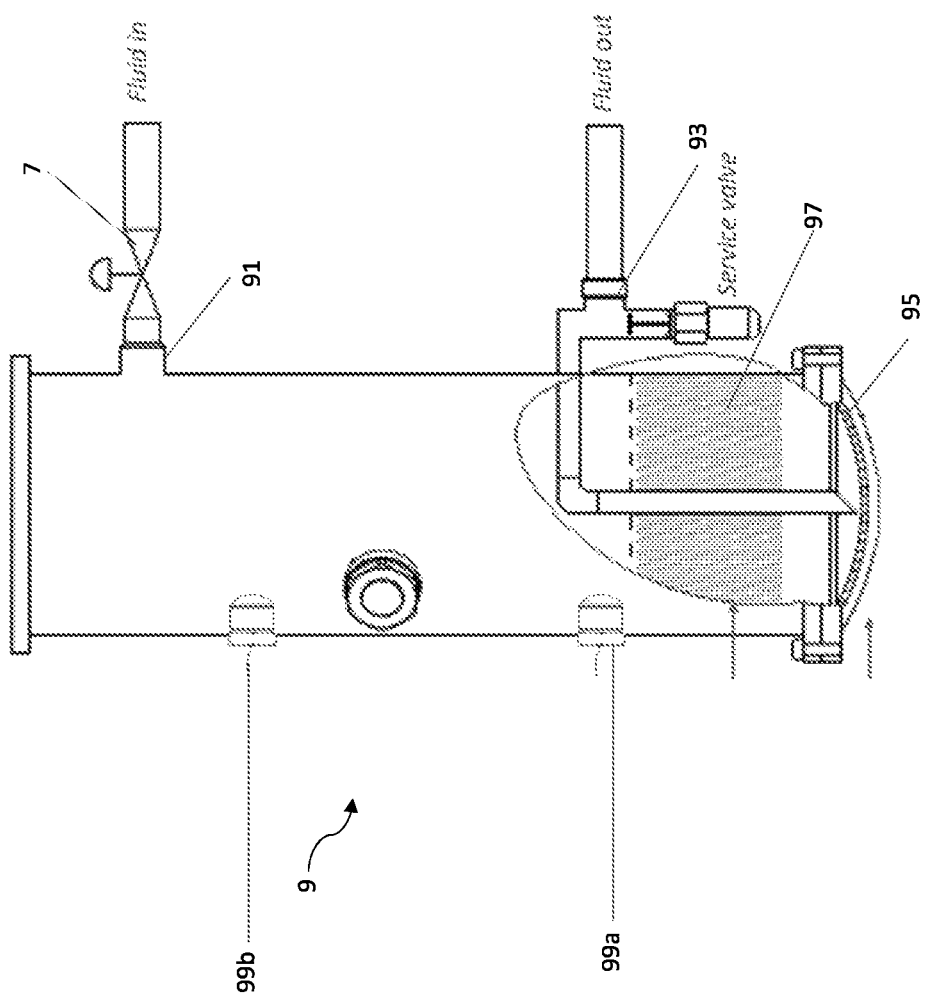
FIG. 3 depicts an alternative form of a flash tank of the refrigeration circuit of FIG. 1.

FIG. 3 shows an alternative exemplary flash tank 9 that can be incorporated into the refrigeration circuit 1 of FIG. 1.

The flash tank 9 of FIG. 3 is almost entirely identical to that of FIG. 2, except that no continuous liquid level sensor 99 is provided 3. Instead, a first liquid level sensor 99a and a second liquid level sensor 99b are provided along a height of the flash tank, the first liquid level sensor 99a being positioned proximate the bottom of the flash tank 9 and the second liquid level sensor being positioned closer to the top of the flash tank 9. More specifically, the first liquid level sensor 99a is positioned at a height within the flash tank such that it is configured to measure the expected quantity of liquid refrigerant within the flash tank when the refrigerant charge in the refrigeration circuit 1 is at 85% of its optimal charge level at the ambient temperature conditions.

The second liquid level sensor 99b is positioned at a height within the flash tank 9 such that it is configured to measure the expected quantity of liquid refrigerant within the flash tank when the refrigerant charge in the refrigeration is at 105% of its optimal charge level at ambient temperature conditions.

The values of 85% and 105% are selected as studies have shown there is no detrimental performance impact to a refrigeration circuit 1 operating at a 5% overcharge or a 15% undercharge as compared to optimal charge level.

The first liquid level sensor 99a can detect whether the quantity of liquid refrigerant within the flash tank 9 falls below the level of the sensor 99a, and if it does then an evaluation that the refrigeration circuit 1 is undercharged can be reached. Similarly, the second liquid level sensor 99b can detect whether the quantity of liquid refrigerant within the flash tank 9 reaches above the level of the sensor 99b, and if it does then an evaluation that the refrigeration circuit 1 is overcharged can be reached. Appropriate remedial action can then be taken to avoid any further possible detriment to performance of the refrigeration circuit 1, including removing or adding refrigerant as required to the circuit 1.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A method of evaluating refrigerant charge within a refrigeration circuit, the method comprising:
   measuring a quantity of liquid refrigerant within a flash tank of the refrigeration circuit;
   determining an expected quantity of liquid refrigerant within the flash tank;
   comparing the expected quantity with the measured quantity of liquid refrigerant within the flash tank; and
   evaluating the refrigerant charge within the refrigeration circuit based on the comparison, wherein evaluating the refrigerant charge comprises determining an undercharge condition within the refrigeration circuit during operation of the refrigeration circuit.

2. The method of claim 1, wherein determining the expected quantity of liquid refrigerant within the flash tank comprises calculating the expected quantity of liquid refrigerant within the flash tank.

3. The method of claim 2, wherein the expected quantity of liquid refrigerant within the flash tank is calculated based on the ambient temperature surrounding the refrigeration circuit.

4. The method of claim 1, wherein determining the undercharge condition comprises determining if the expected quantity of liquid refrigerant exceeds the measured quantity of liquid refrigerant within the flash tank.

5. The method of claim 1, wherein evaluating the refrigerant charge comprises determining an overcharge condition in the refrigeration circuit if the measured quantity of liquid refrigerant exceeds the expected quantity of liquid refrigerant within the flash tank.

6. The method of claim 1, wherein the refrigeration circuit comprises a compressor, a condenser, an expansion valve, and an evaporator sequentially fluidly connected in a circuit, and wherein the flash tank is situated downstream of the condenser and upstream of the expansion valve.

7. The method of claim 1, wherein the method further comprises expanding refrigerant prior to its introduction into the flash tank to ensure that the flash tank comprises a mixture of refrigerant in the liquid and gaseous phases.

8. The method of claim 1, wherein the refrigeration circuit is a refrigeration circuit of a transport refrigeration unit.

9. The method of claim 1, further comprising the step of cooling a refrigerated volume using the refrigeration circuit, and optionally wherein the step of cooling the refrigerated volume occurs simultaneously to the step(s) of measuring a quantity of liquid refrigerant, determining an expected quantity of liquid refrigerant, comparing the expected quantity with the measured quantity of liquid refrigerant, and/or evaluating the refrigerant charge.

10. A method of determining a leak from a refrigeration circuit, the method comprising:
    performing the refrigerant charge evaluation of claim 1 at a first point in time;
    performing the refrigerant charge evaluation of claim 1, at a second, later point in time; and
    determining a leak from the refrigeration circuit based on determining that the refrigerant charge evaluated at the second point in time is less than the refrigerant charge evaluated at the first point in time.

11. The method of claim 10, further comprising repeatedly performing the refrigerant charge evaluation of claim 1 at additional points in time; and repeatedly determining a leak from the refrigeration circuit based on determining that the refrigerant charge evaluated at a given point in time is less than an average of the refrigerant charges evaluated at some or all earlier points in time.

12. The method of claim 2, wherein calculating the expected quantity of liquid refrigerant within the flash tank is based on at least one of: type of the liquid refrigerant and operating mode of the refrigeration circuit.

13. The method of claim 10, wherein determining the leak from the refrigeration circuit is based on a rate of change between the refrigerant charge evaluated at the second point in time and the refrigerant charge evaluated at the first point in time.

14. The method of claim 13, wherein determining the leak from the refrigeration circuit is based on the rate of change being more than a threshold rate.

15. The method of claim 10, wherein determining the leak from the refrigeration circuit is based on determining that the refrigerant charge evaluated at the second point in time is less than the refrigerant charge evaluated at the first point in time by a threshold amount.

16. The method of claim 1, wherein determining the undercharge condition comprises determining that the measured quantity of liquid refrigerant within the flash tank is less than the expected quantity of liquid refrigerant within the flash tank by a threshold amount.

17. An apparatus for evaluating refrigerant charge within a refrigeration circuit, the apparatus comprising:
- a liquid level sensor disposed in operative association with a flash tank of a refrigeration circuit; and
- a processor in communication with the liquid level sensor, the processor being configured to:
  - control the liquid level sensor to measure a quantity of refrigerant within the flash tank;
  - determine an expected quantity of liquid refrigerant within the flash tank;
  - compare the expected quantity with the measured quantity of liquid refrigerant within the flash tank; and
  - evaluate the refrigerant charge within the refrigeration circuit based on the comparison, wherein to evaluate the refrigerant charge, the processor is configured to determine an undercharge condition within the refrigeration circuit during operation of the refrigeration circuit.

18. The apparatus of claim 17, wherein the processor is further configured to:
- control the liquid level sensor to measure a quantity of refrigerant within the flash tank of the refrigeration circuit again, at a second point in time;
- determine an expected quantity of liquid refrigerant within the flash tank at the second point in time;
- compare the expected quantity of liquid refrigerant determined at the second point in time with the measured quantity of liquid refrigerant within the flash tank at the second point in time;
- evaluate the refrigerant charge within the refrigeration circuit based on the comparison at the second point in time; and
- determine a leak from the refrigeration circuit based on determining that the refrigerant charge evaluated at the second point in time is less than the refrigerant charge evaluated at the first point in time.

19. The apparatus of claim 17, wherein the apparatus is configured to carry out the method of claim 1.

20. A non-transitory computer readable medium comprising instructions that, when executed on a processor that is in communication with a liquid level sensor that itself is in operative association with a flash tank of a refrigeration circuit, causes the processor to:
- control the liquid level sensor to measure a quantity of refrigerant within the flash tank of the refrigeration circuit;
- determine an expected quantity of liquid refrigerant within the flash tank;
- compare the expected quantity of liquid refrigerant with the measured quantity of liquid refrigerant within the flash tank; and
- evaluate the refrigerant charge within the refrigeration circuit based on the comparison, wherein to evaluate the refrigerant charge, the processor is caused to determine an undercharge condition within the refrigeration circuit during operation of the refrigeration circuit.

* * * * *